United States Patent [19]
Rahe et al.

[11] Patent Number: 5,899,656
[45] Date of Patent: May 4, 1999

[54] MULTI-PURPOSE TRAILER

[76] Inventors: Jack Rahe; Ronald Rahe, both of Star Rte. 1, Box 173, Maricopa, Calif. 93252

[21] Appl. No.: 08/907,465

[22] Filed: Aug. 8, 1997

[51] Int. Cl.[6] ...................................................... B60P 3/10
[52] U.S. Cl. ......................... 414/537; 280/414.1; 410/24; 410/30
[58] Field of Search .................................... 414/537, 538; 280/414.1; 410/24, 26, 27, 30

[56] References Cited

U.S. PATENT DOCUMENTS

| | | | |
|---|---|---|---|
| 3,677,425 | 7/1972 | Patten | 414/538 |
| 3,734,321 | 5/1973 | Long et al | 414/538 X |
| 3,970,203 | 7/1976 | Watson, Jr. | 280/414.1 X |
| 4,070,030 | 1/1978 | Clark | 414/537 X |
| 4,478,549 | 10/1984 | Stelly et al. | 414/537 |
| 4,705,289 | 11/1987 | Weber | 280/414.1 |
| 5,020,960 | 6/1991 | Provenson | 414/538 X |
| 5,505,514 | 4/1996 | Green | 280/414.1 X |
| 5,772,388 | 6/1998 | Clark | 280/414.1 X |

*Primary Examiner*—David A. Bucci
*Attorney, Agent, or Firm*—Marvin E. Jacobs

[57] ABSTRACT

This invention relates to a multi-purpose boat, boat trailer and motor vehicle trailer. This trailer comprises a frame, a boat trailer wheel support assembly attached to the frame for supporting the boat trailer above the motor vehicle. A pair of boat trailer ramps are provided hingeably connected to the frame and removably attached to the boat trailer wheel support assembly. A pair of wheel support channels on the frame support and guide the wheels of the motor vehicle on the multi-purpose trailer. Additionally, a pair of loading ramps are removably connected to the motor vehicle wheel support channels for loading and unloading the motor vehicle or, alternatively, the channels may be connected to the boat trailer ramps for loading/unloading the boat trailer.

17 Claims, 7 Drawing Sheets

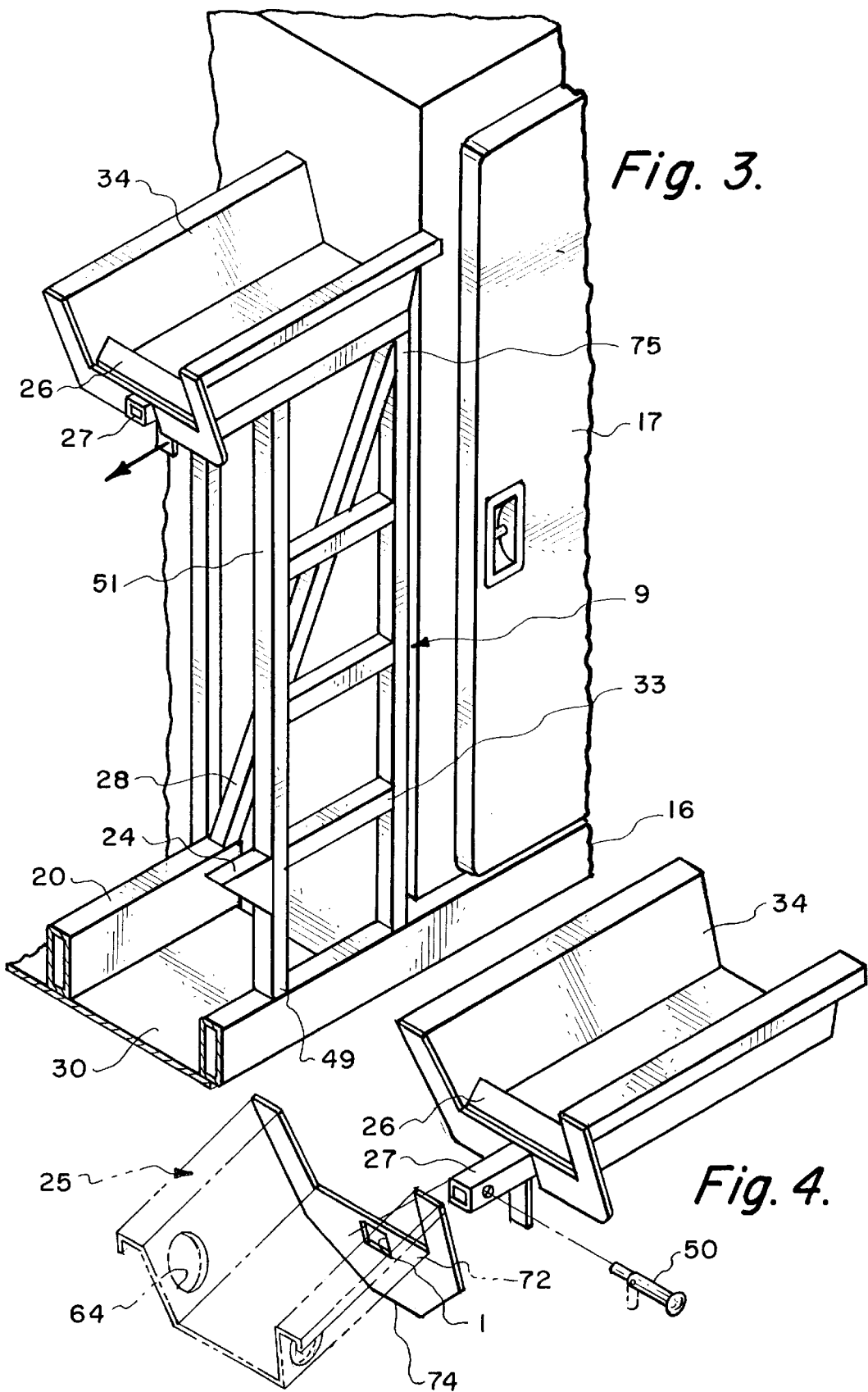

MULTI-PURPOSE TRAILER

TECHNICAL FIELD

The present invention relates to trailers and more specifically to trailers for simultaneously transporting a motor vehicle and a boat trailer carrying a boat.

1. Background of the Invention

The popularity of recreational vehicles and in particular motor homes has led to the desire to travel with a car or other motor vehicle for more convenient and economical transportation when in towns or on side trips. In addition, many people also need to transport a small boat while transporting a secondary motor vehicle. One often undesirable alternative is to keep the size of the boat very small so that it may be carried on top of the secondary motor vehicle, or perhaps carried on top of the motor home. In the many situations where the small boat alternative is not acceptable, travelers have been forced to drive both the motor home and the secondary vehicle and tow the boat on its trailer from one of two vehicles. This clearly and substantially increases the cost and complexity of traveling. For example, when traveling in unfamiliar areas, as is frequently the case with the use of recreational vehicles, turns to other highways, stopping points and other situations that occur while traveling must be communicated between the drivers of the two vehicles.

If the boat trailer is pulled by the motor home, it is difficult or impossible to travel roads leading to remote lakes. A motor home is not an appropriate vehicle to launch a boat from a drive-in launching ramp.

Extensive patent activity verifies that many attempts have been made to overcome the multiple difficult and complex problems of simultaneously transporting a second motor vehicle and a boat. Indeed the degree of patent activity indicates the need for an effective solution and the difficulty of its achievement. A further indication of the difficulty of this problem is the paucity of satisfactory commercial products.

Prior attempts to resolve these problems involve trailer arrangements having undesirable features, for example requiring immersion of the trailer to launch the boat, or the boat trailer carrying a boat, must be elevated by a complex arrangement of mechanisms, hydraulic actuators, articulated structures, and the like. Such designs typically increase the initial cost of the trailer, are difficult to maintain, increase the towing weight, decreased stability in cross winds and with passing trucks, and some have the potential for leaking polluting hydrocarbons.

List of References

| U.S. Pat. No. | Patentee |
|---|---|
| 4,221,420 | Vencill, et al. |
| 4,406,477 | McDonald |
| 4,469,346 | Low |
| 4,560,316 | Daniels |
| 4,589,814 | Cates |
| 4,705,289 | Weber |
| 4,880,250 | Cravens, et al. |
| 4,932,830 | Woodburn |
| 4,946,332 | Daniels |
| 5,152,656 | Potter |

2. Statement of the Prior Art

As stated above, there are many prior disclosures of combination motor vehicle and boat trailers, however, many substantive problems have been left unresolved. Current methods and structures are typically complex, heavy and costly. The prior art generally separates into two relatively broad categories. In the first category the boat is supported on some form of launching mechanism which is part of the combination trailer. In this case the combination trailer is used to launch and retrieve the boat. In the second category a boat trailer carrying a boat is supported by the combination trailer.

Each of the inventions in the first category have the advantage that the boat trailer does not have to be transported by the combination trailer. This category of combination trailers has the limitation that a boat trailer is not available to move the boat after the destination has been reached. The second category, where the boat is carried on its boat trailer and boat trailer is carried by the combination trailer, eliminates the need to immerse the combination trailer and provides a smaller trailer to maneuver the boat for launching and recovery. Both categories provide for movement of the combination trailer by the motor vehicle which had been previously transported by the same trailer. Thus, difficult boat launching maneuvers are not required of the larger motor home or towing truck. Collectively the inventions in both categories provide a variety of mechanisms to raise and secure the boat above the motor vehicle and then prepare it for launching from the combination trailer, examples follow.

In the first combination trailer category, Vencill, et al. (U.S. Pat. No. 4,221,420) includes pivoted scissors arms operated by hydraulically powered rams, and electric motor actuated pump and stabilizing bars with turnbolts. In this invention, the boat is elevated with its bow and stern in a level configuration.

McDonald (U.S. Pat. No. 4,406,477) also supports the boat in a level arrangement with a supporting frame that is raised and lowered via a plurality of posts, pulleys, cables and electrically powered winches.

Daniels (U.S. Pat. No. 4,560,316) places the boat on an inclined hull supporting structure such that the bow is raised to protrude over the motor vehicle. The boat is pulled by a winch from the water (or lowered into the water) with the boat hull resting on rollers to facilitate its movement on the combination trailer. In a later patent, U.S. Pat. No. 4,946,332, Daniels provides for raising and lowering the hull support portion of the trailer to facilitate launch and retrieval of the boat. The raising and lowering is accomplished through a pivoted swing arm assembly that is actuated by a hydraulic ram although other actuators are permissible.

Cates (U.S. Pat. No. 4,589,814) provides a tilting platform to facilitate loading and offloading of the motor vehicle and the boat. To load the boat, it is first winched bow first onto a tilted secondary platform and then elevated by winching a pivoted parallelogram structure. The boat is thus elevated, bow forward, such that a motor vehicle may be driven underneath. After the motor vehicle is on the primary platform, the primary platform, with the attached elevated boat supporting secondary platform, is returned to its level configuration, then secured, ready for transport. Offloading is accomplished by reversing these steps.

Woodburn (U.S. Pat. No. 4,932,830) provides for a boat supporting cradle which is raised to an elevated position on four vertical corner support columns. Once the boat is elevated, a motor vehicle may be driven under the boat carrying cradle. The raising process is accomplished by a plurality of cables, pulleys and a winch. Safety locks are provided to secure the boat and cradle assembly for transport.

Potter (U.S. Pat. No. 5,152,656) also provides a tilting platform but only the stern of the boat is raised to provide space for the front portion of the motor vehicle with the vehicle's front wheels supported by the combination trailer. During transport, the motor vehicle rides on its own rear wheels. The rear section of the boat support frame is supported by a pivoted arch frame. The arch frame, operated by a cable and winch assembly or hydraulic rams, raises and lowers the rear section of the boat platform as required.

In the second category of combination or multi-purpose trailers, a boat trailer is used to support and carry a boat on the trailer. Low (U.S. Pat. No. 4,469,346) is a multi-purpose trailer which includes a pair of brackets pivotably connected to the frame of a conventional trailer towed by a motor home. These brackets, in their lowered position, are connected to the forward and rearward ends of a boat trailer. A winch, preferably electrically operated, advances a forward leading cable, connected to the rearward bracket, provides the means to pivot both brackets forward and upward. Locking means are provided to secure the elevated boat trailer and boat assembly for transport. In this fashion the boat trailer, and boat, are elevated and locked such that a motor vehicle may be transported below the boat trailer. Lowering of the boat trailer is accomplished in the reverse process. As with all combination trailers in this second category, after the boat trailer is lowered, the boat trailer may be maneuvered by the transported motor vehicle, instead of by the motor home, for launching the boat.

Weber (U.S. Pat. No. 4,705,289) describes a dual load trailer which incorporates a pair of inclined ramps which receive the wheels of a boat trailer and elevates that portion of the boat trailer sufficiently so that the trunk of an automobile may later be positioned underneath. The boat trailer is pulled backwards up the inclined ramps with a cable connected to a winch mounted to the frame of the dual load trailer. The next operation is to connect the same cable to the rear of the boat trailer and pull it downward to raise the tongue of the boat trailer. After the tongue is raised, a pair of laterally spaced support members pivotably connected to the frame of the dual load trailer are raised to support the boat trailer. Other brackets and latches are used to finally secure the boat and boat trailer for transport. At this point, the automobile may be backed onto the dual load trailer. A pair of loading members (ramps) are used between the trailer and the ground to facilitate loading either the boat trailer or the automobile. A reverse procedure permits the automobile and the boat trailer to be offloaded.

Cravens et al. (U.S. Pat. No. 4,880,250) discloses an attachment kit for a conventional flatbed trailer. The kit includes a pair of tiltable boat trailer ramps which are pivotably supported by a first pair of supports positioned towards the front of the flatbed trailer. A second pair of adjustable supports are provided adjacent to the rear of the flatbed trailer. Prior to loading the boat trailer the ramps are tilted down to the flatbed at the rear of the trailer, pivoting about the first supports. Retractable loading ramps are provided between the ground surface that the flatbed of the trailer. The boat trailer is then backed up onto the loading and tiltable ramps using the power of the motor vehicle. A winchable chain is then connected between the boat trailer axle and a cross-member between the pair of first supports. This prevents the boat trailer from moving down the ramp after the trailer is disconnected from the automobile. During the loading operation, the wheels of the boat trailer are positioned on the tiltable ramp just forward of the first pair of supports. Thus a moment arm is created which allows the tongue of the boat trailer to be lifted by a person to an elevated position and locked to the second pair of supports. At this point, the automobile may be driven onto the flatbed and under the boat trailer. The loading ramps are then retracted into the flatbed trailer in preparation for transport of the boat trailer carrying the boat and the automobile. A reverse operation is performed to offload the automobile and boat trailer.

As can be understood from this review of the prior art, substantial opportunities remain to improve the performance of multi-purpose trailers by reducing their complexity, eliminating power actuators, lowering fabrication and maintenance costs and improving safety of operations.

STATEMENT OF THE INVENTION

The multi-purpose trailer of this invention simultaneously transports a motor vehicle and a boat trailer carrying a boat. This invention provides a carefully and thoughtfully designed and engineered multi-purpose trailer for safely transporting a motor vehicle, and a boat on its boat trailer. Typically the trailer is towed behind a motor home or a truck. The trailer is designed such that a single person can safely and surely load and unload both the boat trailer and the motor vehicle. This invention also provides for a substantial general use compartment to provide a convenient and efficient weatherproof cargo storage area, workshop, sleeping area, changing room, etc.

This invention is simple in that it does not use or require any hydraulic rams, or other mechanically assisted and powered actuators to load and position the boat and boat trailer. The structure is strong, yet light weight and compact to optimize the aerodynamics to maximize fuel efficiency of the towing vehicle and to minimize the effect of cross winds and passing vehicles. Full access to all portions of the loaded boat trailer, boat, motor vehicle and general use compartment is provided by a variety of running boards, doors, and, innovatively, a pair of ladders and lowerable boat trailer ramps. The ladders not only provide full access to the boat in its transport position but also serve as the primary support structure for the elevated boat trailer. The lowerable boat trailer ramps provide for easy ingress and egress of the transported motor vehicle while it is loaded on the multi-purpose trailer.

This invention, a multi-purpose boat, boat trailer and motor vehicle trailer, comprises a frame and a boat trailer wheel support assembly attached to the frame for supporting the boat trailer above the motor vehicle. A pair of boat trailer ramps are provided, each hingeably connected to the frame and removably attached to the boat trailer wheel support assembly. A pair of wheel support channels on the frame support and guide the wheels of the motor vehicle on the multi-purpose trailer. Additionally, a pair of loading ramps are removably connected to the motor vehicle wheel support channels for loading and unloading the motor vehicle or, alternatively, the channels may be connected to the boat trailer ramps for loading/unloading the boat trailer.

In operation, the boat trailer with its boat included is loaded on the multi-purpose trailer before the motor vehicle. Before the actual loading of the boat/boat trailer, the loading ramps are removed from their storage location on the multi-purpose trailer and connected between the lower end of the boat trailer ramps and on the ground. The boat trailer is then conveniently pushed up the ramps by a tow vehicle until the boat trailer's wheels are in the wheel wells. Chocks which can be integral with the wheel wells secure the wheels. The tongue of the boat trailer is then released from the tow vehicle and the end of the boat opposite the boat trailer tongue is pulled down to raise the boat trailer tongue. This function may be facilitated by a hand operated winch. This raises the tongue end of the boat trailer to permit access of the motor vehicle onto the trailer. The next step is to manually lower the boat trailer ramp on the driver's side of the motor vehicle to rest on its support bracket. This will facilitate the exit of the driver from the motor vehicle after it is loaded on the trailer.

The loading ramps are then relocated and attached to the wheel support channels. The motor vehicle is then driven up the loading ramps and onto the support channels. At this point the vehicle driver is free to exit the vehicle without conflict with a boat trailer ramp. The trailer tongue is then lowered into a U shaped bracket attached to the top of the motor vehicle. The loading ramps are then returned to their stowed position on the multi-purpose trailer. The boat, boat trailer and motor vehicle are then tied down to the trailer as needed for their secure transport.

These and many other features and attendant advantages of the invention will become apparent as the invention becomes better understood by reference to the following detailed description when considered in conjunction with the accompanying drawings.

BRIEF RESCRIPTION OF THE DRAWINGS

FIG. 3 is perspective view of the right side wheel support assembly;

FIG. 4 is a perspective, exploded view showing the deadbolt on a wheel well;

DETAILED DESCRIPTION OF THE INVENTION

Figure 1A:
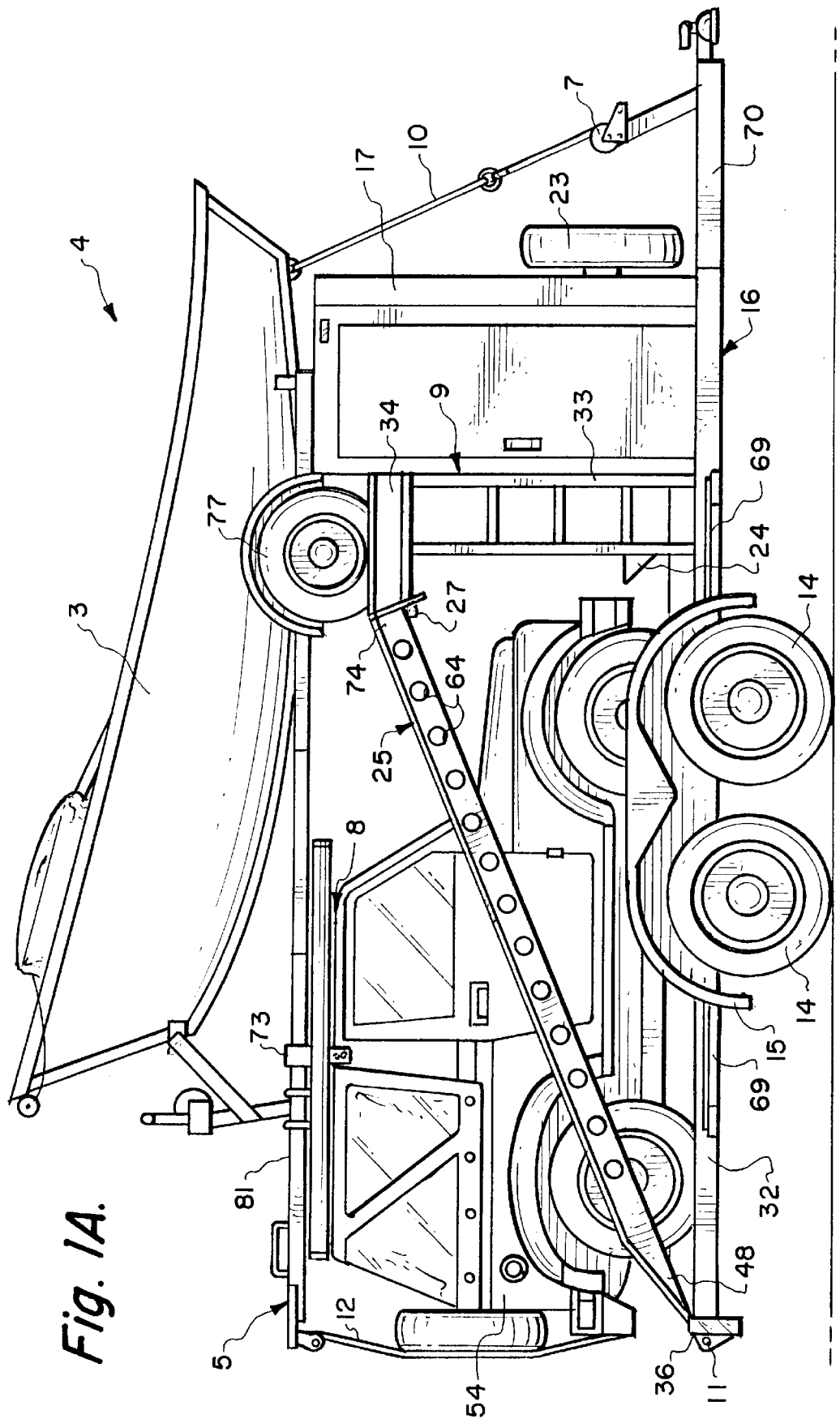
FIG. 1A is a right side elevation view of the multi-purpose trailer showing the motor vehicle, boat trailer and boat in their transport position.
Figure 1B:
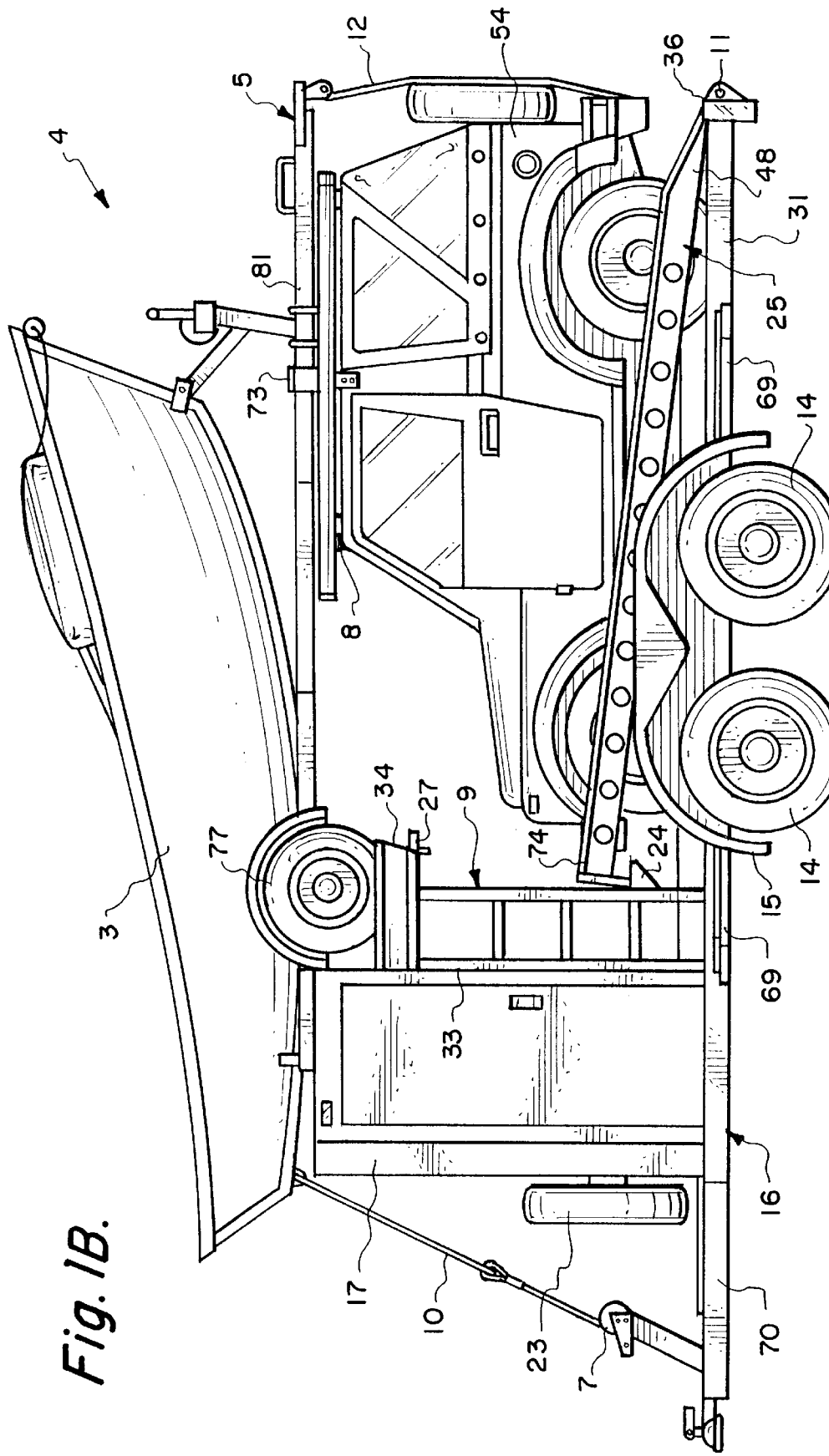
FIG. 1B is a left side elevation view showing the ramp lowered.

With reference to FIGS. 1A, 1B and FIGS. 2A, 2B and 2C, this invention, a multi-purpose trailer 4 for simultaneously transporting a motor vehicle 54, and a boat trailer 5 carrying a boat 3, comprises a frame 16 with left and right sides 31, 32, a tongue end 70, a loading end 36 and a plurality of crossmembers 13 connected to and between said left and right sides 31, 32. The multi-purpose trailer 4 further comprises a boat trailer wheel support assembly 9 attached to frame 16, and left and right boat trailer ramps 25 each hingeably connected to the loading end 36 of frame 16 and removably attached to boat trailer wheel support assembly 9. FIG. 1A shows a boat trailer ramp 25 in position to load or unload trailer 5. FIG. 1B shows the ramp 25 lowered to its support bracket 24 to provide convenient ingress/egress from the motor vehicle 54. Motor vehicle support channels 30 are mounted to the frame between the tongue end 70 and the loading end 36 to support and guide the motor vehicle. Expanded metal is used as a platform 65 between the wheel support channels 30. Left and right loading ramps 29 are removably connected to frame 16.

As shown in FIGS. 1A–B and 2A–B, an important feature of the preferred embodiment of this invention is a general use compartment 17. This compartment provides a substantial enclosed and protected area for storage of equipment, for example to support boating operations. It also provides an area for a workshop, apparel changing, or for refuge from inclement weather and spare tire 23 on the outside of compartment 17.

Also shown in FIGS. 1A–B and 2A–B, fenders 15 used to cover the multi-purpose trailer's wheels 14 are attached to frame 16. Running boards 69 are also provided to facilitate full and complete access to all portions of the multi-purpose trailer 4.

FIG. 3 shows the detail of the boat trailer wheel support assembly 9 including left and right structural ladders 33 each having an upper section 75 and a lower section 49. The lower sections 49 are rigidly and fixedly attached to their respective sides of the frame 16. The lower sections 49 have a bracket 24 to support boat trailer ramps 25 when they are lowered from their normal loading/unloading positions (see FIGS. 1A and 1B). Each structural ladder 33 has a diagonal support 28 that is rigidly and fixedly connected between the upper section 75 of each structural ladder 33 and the inboard side 20 of each motor vehicle wheel support channel 30.

Also depicted in FIG. 3 are the left and right wheel wells 34. They are rigidly and fixedly attached to the upper sections 75 of the each structural ladder 33 to accommodate the wheels 77 of the boat trailer 5. As shown in FIG. 4, each wheel well 34 has a chock 26 for securing the boat trailer wheels 77 in wells 34. A deadbolt 27 is also provided in each well 34 for attaching the boat trailer ramps 25. A deadbolt securing means 50 is also shown.

FIGS. 1A–B, 2A–B and 5A–C show the preferred embodiment of the boat trailer ramps 25 each having two sides 72 to confine and guide wheels 77 of boat trailer 5 during the loading and unloading of the boat trailer 5. The sides 72 have lightening holes 64 to reduce their weight without compromising strength. The ramps 25 each have an upper end 74 with an aperture 1 for receiving the deadbolt 27 from its respective wheel well 34 thus removably securing the ramps 25 to the wheel wells 34. The ramps 25 have lower ends 48 with a boat trailer ramp hinge 11 connecting each of them to the loading end 36 of the frame 16. Thus arranged, when the deadbolt 27 is retracted into its respective wheel well 34, the upper end 74 of each boat trailer ramp 25 may be lowered to its respective support bracket 24 on the structural ladder 33.

Referring again to FIG. 2A–B, left and right motor vehicle wheel support channels 30 are laterally displaced and secured to the frame 16 between the tongue end 70 and the loading end 36. Each wheel support channel 30 has an inboard side 20 and an outboard side 21, a loading end 37 and at least one motor vehicle wheel chock 78 similar to chock 26 to assist in securing the motor vehicle 54 to the multi-purpose trailer 4.

Figure 2A:
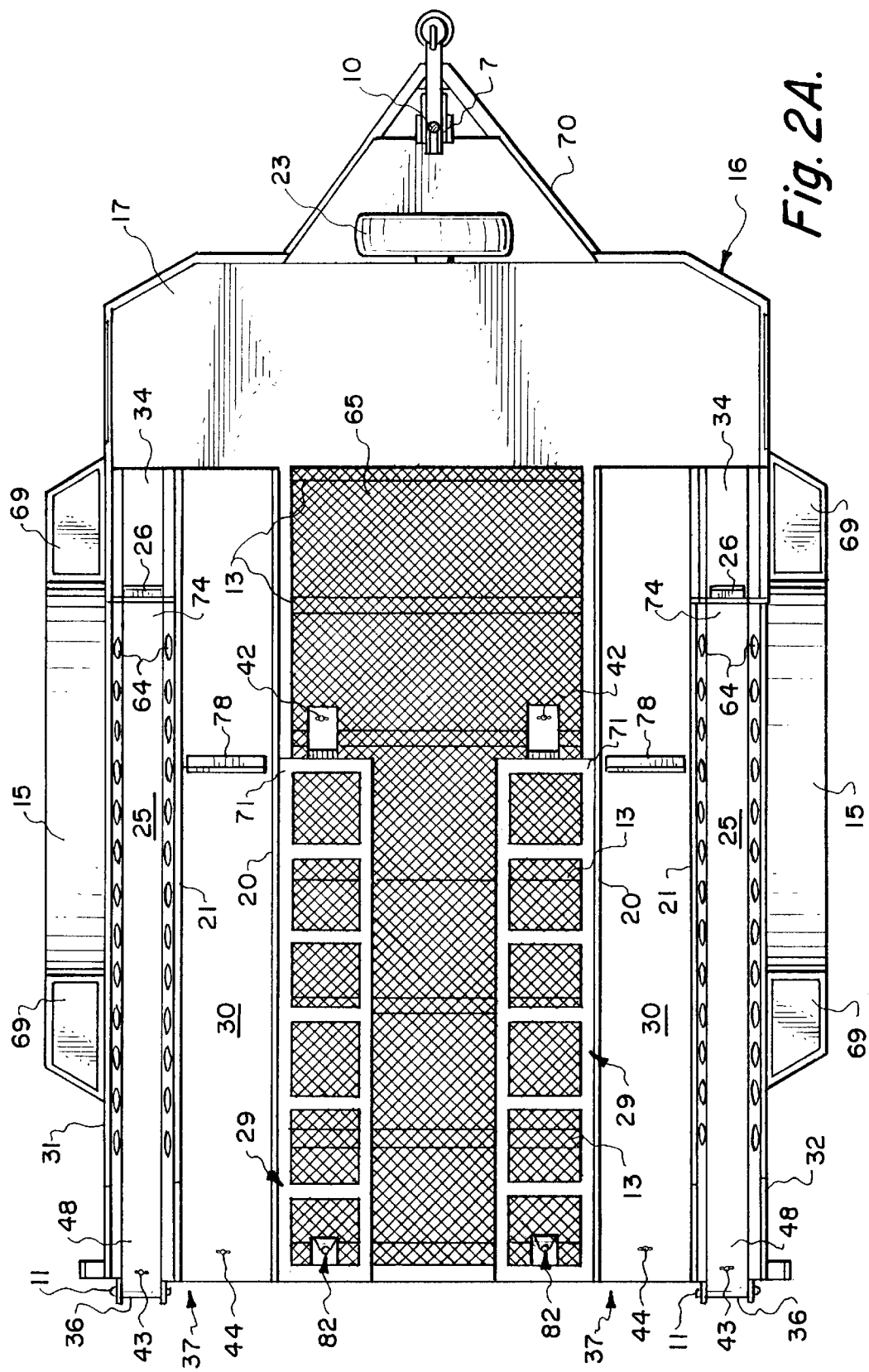
FIGS. 2A, 2B and 2C are plan views of the multi-purpose trailer, without the motor vehicle, boat trailer and boat, and depict the three locations of the loading ramps.
Figure 2B:
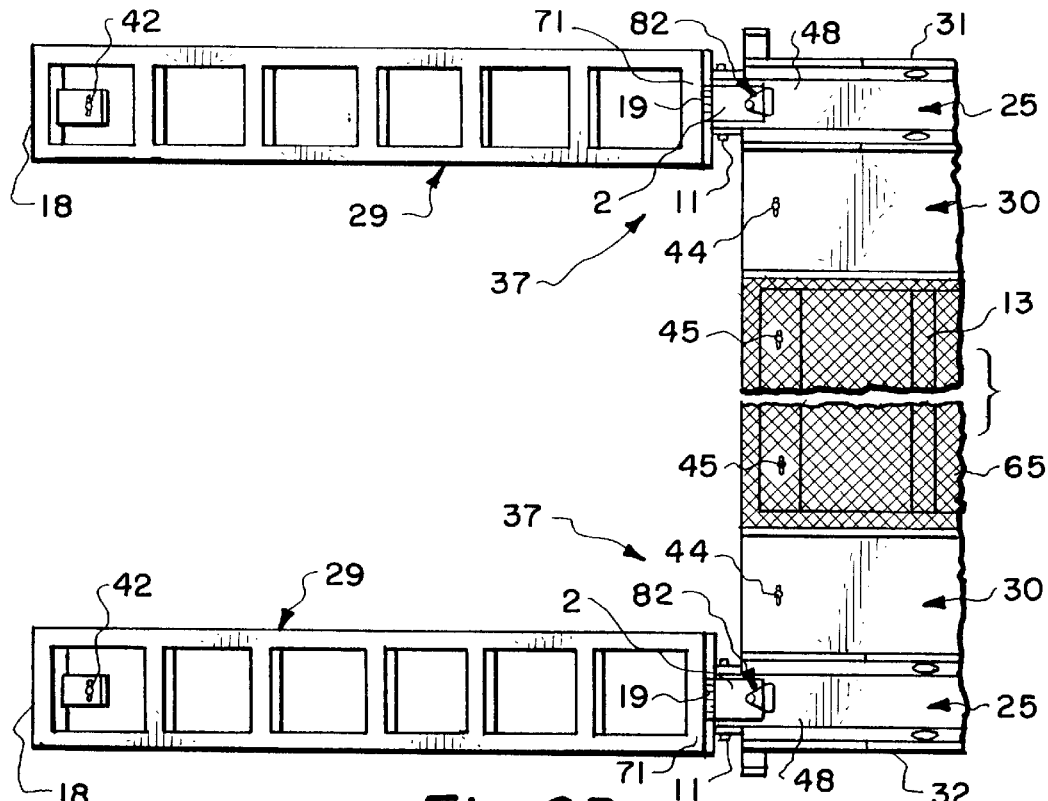
Figure 2C:
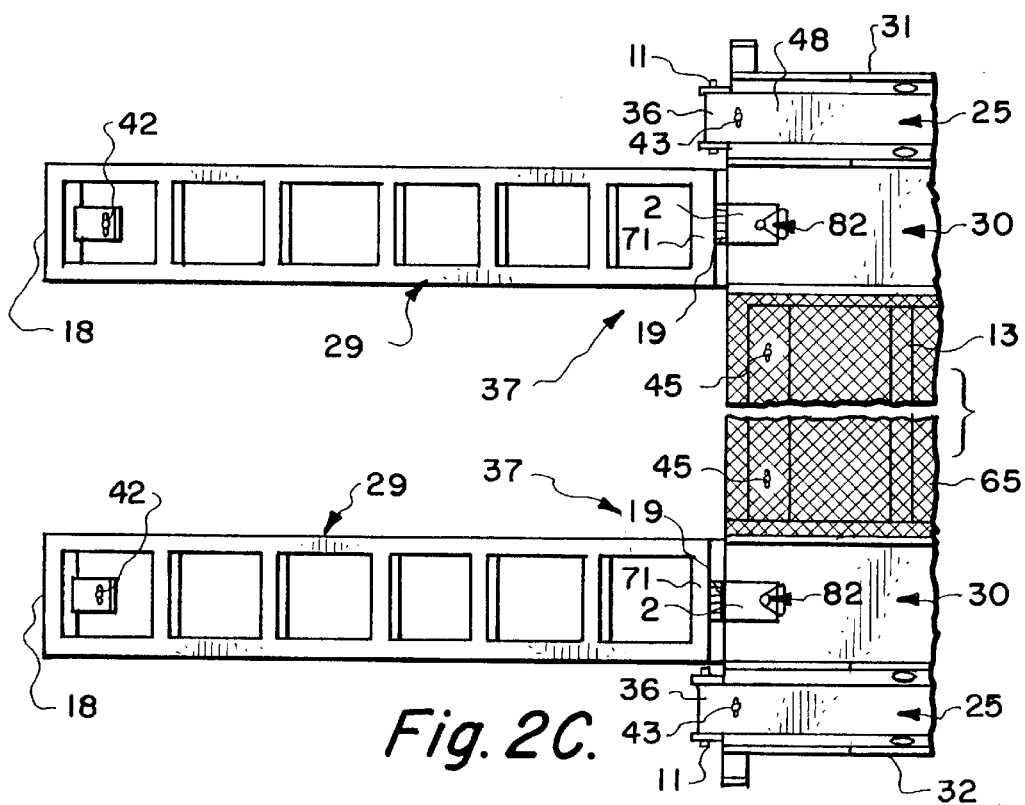
Figure 5A:
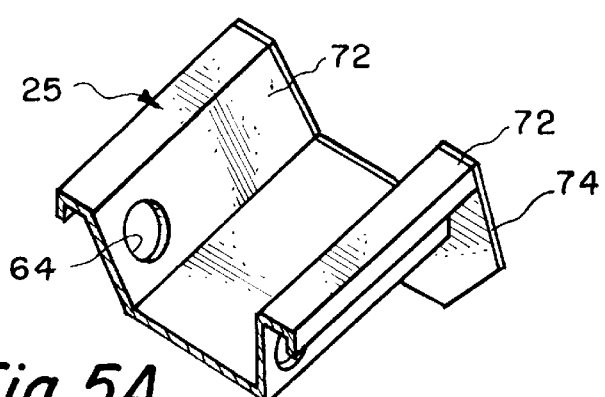
FIGS. 5A, 5B and 5C are perspective views showing a boat trailer ramp and its deadbolt receiving aperture.
Figure 5B:
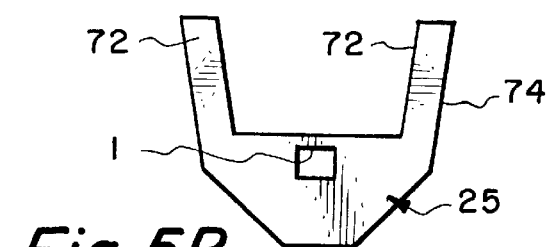
Figure 5C:
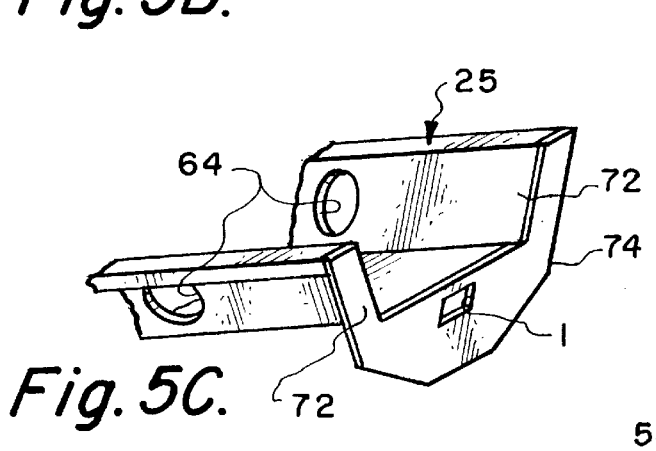
Figure 6A:
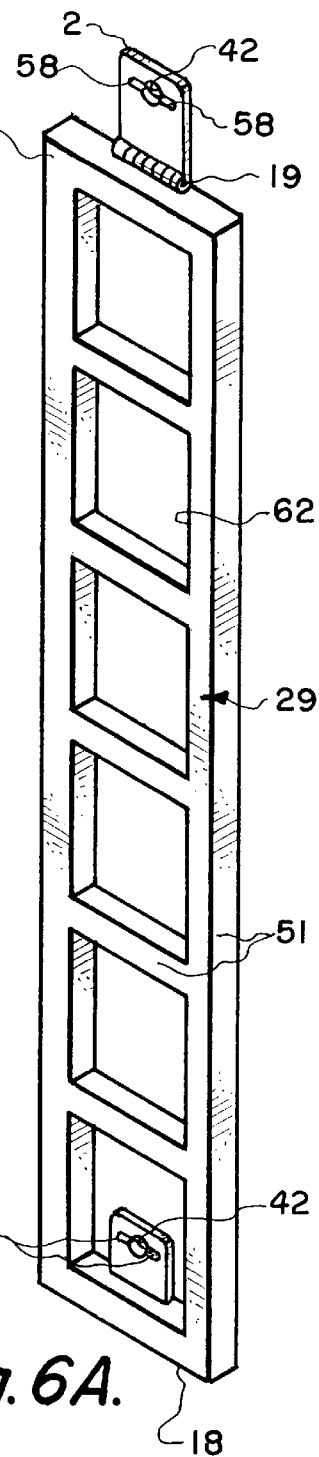
FIGS. 6A and 6B are perspective views showing one of the loading ramps and a locking pin.

With reference now to FIG. 6A, left and right loading ramps 29 each have a ground end 18, a trailer end 71, a locking pin 82, and an attachment tab 2 which is connected by a loading ramp hinge 19 to the trailer end 71. The loading ramps 29 are used to load (or unload) both the boat trailer 5 and boat 3, and the motor vehicle 54 on multi-purpose trailer 4. As shown in FIG. 6A, in the preferred embodiment the loading ramps are formed in an open ladder configuration 62 which decreases their weight and enhances traction with the wheels of the boat trailer 5 and the motor vehicle 54. Referring also to FIGS. 2A, 2B and 2C, attachment tabs 2 have locking pin receiving apertures 42 whereby loading ramps 29 are removably attached to their respective boat trailer ramps 25. This is accomplished by inserting locking pins 82 through locking pin receiving apertures 42 in attachment tabs 2 and in the cooperatively aligned locking pin receiving apertures 43 in the lower ends 48 of boat trailer ramps 25. Alternatively loading ramps 29 are removably attached to their respective motor vehicle wheel support channels 30 by inserting locking pins 82 through cooperatively aligned locking pin receiving apertures 42 in attachment tabs 2 and locking pin receiving apertures 44 in loading ends 37 of said motor vehicle wheel support channels.

Figure 6B:
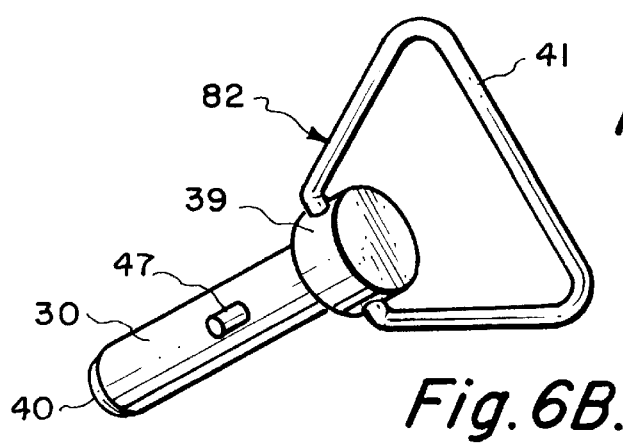

As shown in FIGS. 2A, 2B and 2C, for all three locations of the loading ramps 29, i.e. stored on the platform 65, attached to the wheel support channels 30 or the boat trailer ramps 25, the loading ramps 29 are fully secured after locking pin 82 have been fully inserted in cooperating receiving apertures, 42, 43, or 42 and 44 or 42 and 45, by grasping and rotating 90 degrees locking pin gripping means 41, FIG. 6B. To accomplish this feature in the preferred embodiment, FIG. 6B shows locking pins 82 being formed as a right circular cylinder 31 having first and second ends 39, 40, first end 39 includes gripping means 41, a pair of opposed diametrical studs 47 protruding orthogonally from the cylinder 31 between said first and second ends 39, 40.

To cooperate with the locking pins 82, receiving apertures 42 in attachment tabs 2, receiving apertures 43 in lower end of ramps 29, receiving apertures 44 in wheel support channels 30, and receiving apertures 45 in loading end 36 of frame 16, each have notches 58, shown in FIGS. 2A, 2B, 2C and 6A, to receive diametrically opposed studs 47.

Figure 7A:
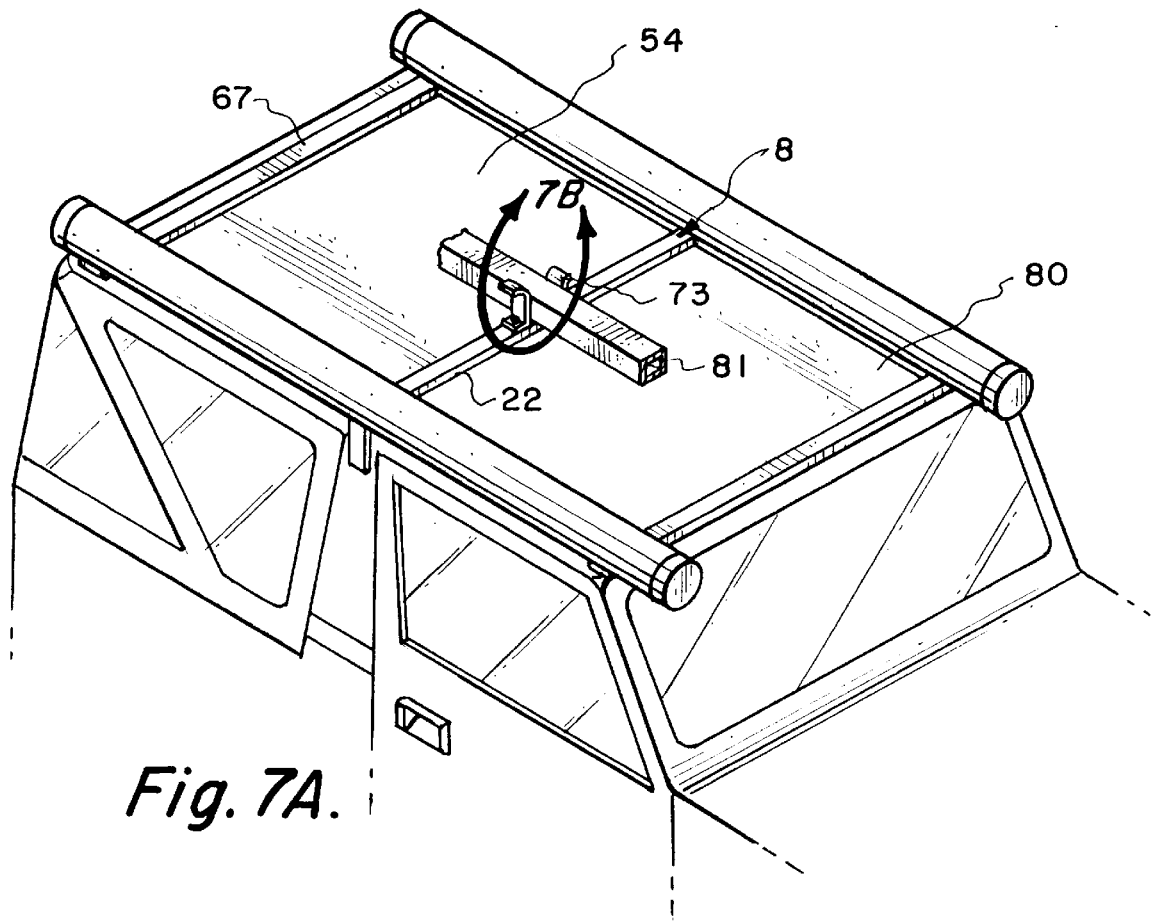
FIG. 7A is a perspective view showing the boat trailer tongue support assembly mounted on the roof of a vehicle.
Figure 7B:
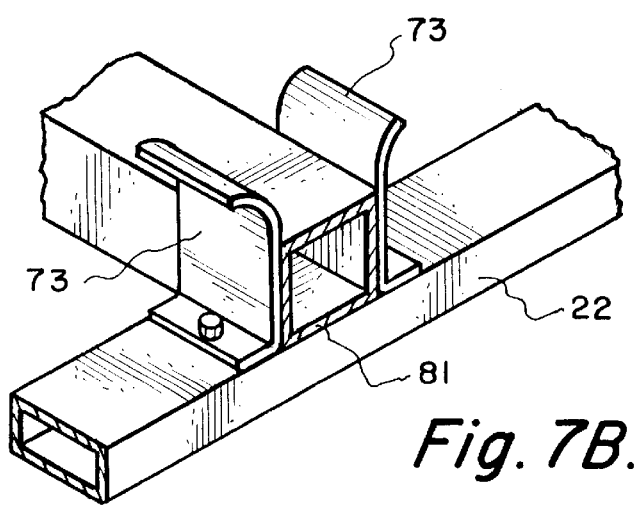
FIG. 7B is an enlarged view of a detail of a bracket taken along line 7B of FIG. 7A.

FIG. 7A–B illustrates boat trailer tongue support assembly 8 comprised of a rectangular framework 67 attached to the top 80 of motor vehicle 54. The framework 67 has at least one lateral horizontal cross piece 22 and includes a U shaped vertical member 73. This U shaped member 73 is secured to the cross piece 22 equidistant between the sides of the motor vehicle 54 and directly under the tongue 81 of boat trailer 5. A cinchable strap 12 as shown in FIGS. 1A and 1B, is used to secure the boat trailer tongue 81 in the U shaped vertical member 73.

In the preferred embodiment, and as shown in FIGS. 3 and 6A–B, frame 16, left and right loading ramps 29, left and right structural ladders 33 and said left and right diagonal supports 28 are fabricated from rectangular metal tubing 51, typically steel.

In operation, the boat trailer 5, carrying boat 3, is loaded on the multi-purpose trailer 4 before the motor vehicle 54. The loading ramps 29 are first removed from their storage location on the multi-purpose trailer 4 and connected to the lower end 48 of the boat trailer ramps 25, the ground end 18 resting on the ground. The boat trailer 5 is then conveniently pushed up the loading ramps 29 and boat trailer ramps 25 by a tow vehicle (usually the same vehicle that is later put on the multi-purpose trailer 4) until the boat trailer's wheels are in the wheel wells 34 and secured by chocks 26. The boat trailer tongue 81 is then released from the tow vehicle and the end of the boat 3 opposite the boat trailer tongue 81 is manually pulled down to raise the boat trailer tongue 81. This may be facilitated by a winch 7 operating on a pull down line 10 connected to the boat 3 or boat trailer 5. This is done to permit access of the motor vehicle 54 on multi-purpose trailer 4. The next step is to manually lower the boat trailer ramp 25 on the driver's side of the motor vehicle 54 to rest on its support bracket 24 (See FIGS. 1A and 1B). This will facilitate the exit of the driver from the motor vehicle 54 after it is loaded on the multi-purpose trailer 4.

In preparation for loading the motor vehicle 54, the loading ramps 29 are relocated and secured to the motor vehicle support channels. The motor vehicle 54 is then driven up the loading ramps 29 onto the wheel support channels 30 until its wheels pass over the chocks 78 in the wheel support channels. Since boat trailer ramp 25 had been previously lowered to its support bracket 24, the vehicle driver is free to open the vehicle's door and exit without being hampered by a boat trailer ramp 25. The boat trailer tongue 81 is then lowered by paying out pull down line 10 until tongue 81 is in U shaped vertical member 73.

When the loading (or unloading operation) is completed, loading ramps 29 are positioned on platform 65 and secured to the loading end 36 of frame 16 by inserting locking pins 82 into their respective locking pin receiving apertures 42 in attachment tabs 2 and through cooperatively aligned locking pin receiving apertures 45 in the loading end 36 of frame 16. Lastly, in preparation for transport, the motor vehicle and boat trailer are both secure to the multi-purpose trailer 4. In the preferred embodiment, chains are used to secure the boat trailer's axle to the structural ladders 33 and to secure the motor vehicle 54 to frame 16. The chains in both cases are tightened by chain binders.

It is to be realized that only preferred embodiments of this invention have been described, and that numerous substitutions, modifications, alterations, and applications are permissible without departing from the spirit and scope of the invention as defined in the following claims.

We claim:

1. A multi-purpose trailer for simultaneously transporting a motor vehicle and a boat trailer carrying a boat, comprising:

a frame;

a pair of boat trailer wheel support assemblies attached to said frame;

a pair of boat trailer ramps each hingeably connected to said frame and removably attached to said boat trailer wheel support assemblies;

a pair of motor vehicle wheel support channels fixedly secured to said frame; and a pair of loading ramps each removably connected to said frame.

2. A multi-purpose trailer according to claim 1 wherein:

said frame includes a left side, a right side, a tongue end, a loading end and a plurality of crossmembers connected to and between said left and right sides;

said pair of motor vehicle wheel support channels including left and right motor vehicle wheel support channels are laterally displaced and longitudinally secured to said frame between said tongue end and said loading end, each of said wheel support channels having an inboard side and an outboard side, a loading end including a locking pin receiving aperture and at least one motor vehicle wheel chock;

a platform is disposed between the inboard sides of said motor vehicle wheel support channels and securely connected to said frame and said crossmembers;

at least two fenders are secured to said frame outboard of said motor vehicle support channels for covering wheels of said multipurpose trailer; and a plurality of running boards are attached to said frame and positioned outboard of said wheel support channels and immediately in front of and behind said fenders.

3. A multi-purpose trailer according to claim 2 wherein said pair of boat trailer wheel support assemblies comprises:

a left structural ladder having an upper section and a lower section said lower section being rigidly and fixedly attached to the left side of said frame, said lower section further including a boat trailer ramp left support bracket;

a right structural ladder having an upper section and a lower section said lower section being rigidly and fixedly attached to the right side of said frame, said lower section further including a boat trailer ramp right support bracket;

a left diagonal support rigidly and fixedly connected between the upper section of said left structural ladder and the inboard side of said left motor vehicle wheel support channel;

a right diagonal support rigidly and fixedly connected between the upper section of said right structural ladder and the inboard side of said right motor vehicle wheel support channel;

a left wheel well rigidly and fixedly attached to the upper section of the left structural ladder, said left wheel well having a left chock for securing a wheel of said boat trailer and further having a left deadbolt for attaching said left boat trailer ramp to said left wheel well; and a right wheel well rigidly and fixedly attached to the upper section of the right structural ladder, said right wheel well having a right chock for securing a wheel of said boat trailer and further having a right deadbolt for attaching said right boat trailer ramp to said right wheel well.

4. A multi-purpose trailer according to claim 3 wherein said pair of boat trailer ramps includes left and right boat trailer ramps each including two sides whereby the wheels of said boat trailer are confined and guided in said boat trailer ramps, said boat trailer ramps each further comprising:

an upper end having an aperture for receiving a deadbolt from its respective wheel well and thereby removably securing said ramps to said wheel wells; and a lower end having a hinge connected between said ramps and the loading end of said frame whereby the upper end of each boat trailer ramp may be lowered to its respective support bracket upon retracting the deadbolt into its respective wheel well, and said lower end further including a locking pin receiving aperture.

5. A multi-purpose trailer according to claim 4 wherein said pair of loading ramps includes left and right loading ramps which further include:

a ground end;

a trailer end;

a locking pin; and an attachment tab hingeably connected to said trailer end, said attachment tab including a locking pin receiving aperture whereby said loading ramp is removably attached to its respective boat trailer ramp by inserting said locking pin through the cooperatively aligned locking pin receiving apertures in said attachment tab and in the lower end of said boat trailer ramp, or alternatively whereby said loading ramp is removably attached to its respective motor vehicle wheel support channel by inserting said locking pin through the cooperatively aligned locking pin receiving apertures in said attachment tab and in the loading end of said motor vehicle wheel support channel.

6. A multi-purpose trailer according to claim 5 wherein said left and right loading ramps each further includes a locking pin receiving aperture in said ground end, and wherein the loading end of said frame includes a pair of locking pin receiving apertures whereby said loading ramps are removably attached to said frame by inserting said locking pins through the cooperatively aligned locking pin receiving apertures in said ground end of said loading ramps and in said platform adjacent to the loading end of said frame.

7. A multi-purpose trailer according to claim 6 wherein:

the loading ramp locking pins are formed as a right circular cylinder having first and second ends, said first end including a gripping means, said locking pins further including a pair of opposed diametrical studs protruding orthogonally from the right circular cylinder between said first and second ends; and the locking pin receiving apertures in the boat trailer ramps, in the motor vehicle wheel support channels, in the loading end of said frame and in the attachment tabs of the loading ramps each have a pair of diametrically opposed notches for cooperatively receiving the opposed studs of said locking pins.

8. A multi-purpose trailer according to claim 1 further including a boat trailer tongue support assembly removably attached to a top of said motor vehicle.

9. A multi-purpose trailer according to claim 8 wherein said boat trailer tongue support assembly is comprised of a rectangular framework attached to the top of said motor vehicle, said framework having at least one lateral horizontal cross piece including a U shaped vertical member secured to the cross piece equidistant between sides of the motor vehicle and directly under a tongue of said boat trailer.

10. A multi-purpose trailer according to claim 9 wherein said boat trailer tongue is retained in said U shaped vertical member by a cinchable strap connected to and between said tongue and said motor vehicle.

11. A multi-purpose trailer according to claim 4 wherein the sides of said boat trailer ramps are perforated.

12. A multi-purpose trailer according to claim 7 wherein said loading ramps are formed in an open ladder configuration.

13. A multi-purpose trailer according to claim 3 wherein the deadbolts of said wheel wells further include a means for securing the deadbolts after they have been received by the receiving apertures of said boat trailer ramps.

14. A multi-purpose trailer according to claim 6 wherein said frame, said left and right loading ramps, said left and right structural ladders and said left and right diagonal supports are fabricated from metal tubing.

15. A multi-purpose trailer according to claim 2 wherein said platform is fabricated from a sheet of expanded metal.

16. A multi-purpose trailer according to claim 1 further comprising a general use compartment mounted to said frame.

17. A multi-purpose trailer for simultaneously transporting a motor vehicle and a boat trailer carrying a boat, comprising:

a frame;

a general use compartment mounted to said frame;

a pair of boat trailer wheel support assemblies attached to said frame;

a pair of boat trailer ramps each hingeably connected to said frame and removably attached to said boat trailer wheel support assemblies;

a pair of motor vehicle wheel support channels fixedly secured to said frame; and a pair of loading ramps each removably connected to said frame.

* * * * *